United States Patent [19]

Arthur et al.

[11] Patent Number: 4,850,189
[45] Date of Patent: Jul. 25, 1989

[54] MANIFOLD BAFFLE SYSTEM

[75] Inventors: James C. Arthur; Freddie A. Baldwin, both of Columbus, Ind.

[73] Assignee: Arvin Industries, Inc., Columbus, Ind.

[21] Appl. No.: 108,002

[22] Filed: Oct. 14, 1987

[51] Int. Cl.⁴ .............................................. F01N 7/10
[52] U.S. Cl. ....................................... 60/323; 60/313
[58] Field of Search ........................ 60/322, 323, 313

[56] References Cited

U.S. PATENT DOCUMENTS

| | | | |
|---|---|---|---|
| 2,940,249 | 6/1960 | Gospodar | 60/313 |
| 3,488,944 | 1/1970 | Saletzki et al. | |
| 3,543,509 | 12/1970 | Boerma | 60/323 |
| 3,703,083 | 11/1972 | Tadokoro | 60/322 |
| 3,722,221 | 3/1973 | Chopin et al. | 60/282 |
| 3,729,937 | 5/1973 | Haddak | 60/298 |
| 3,796,048 | 3/1974 | Annus et al. | 60/598 |
| 3,798,903 | 3/1974 | Mitchell et al. | 60/282 |
| 3,916,850 | 11/1975 | Date et al. | 123/52 |
| 3,940,927 | 3/1976 | Maurhoff et al. | 60/282 |
| 4,022,019 | 5/1977 | Garcea | 60/282 |
| 4,055,043 | 10/1977 | Konishi et al. | 60/282 |
| 4,215,093 | 7/1980 | Yasuda | 421/179 |
| 4,301,775 | 11/1981 | Smart et al. | 123/52 |
| 4,373,331 | 2/1983 | Santiago et al. | 60/323 |
| 4,537,027 | 8/1985 | Harwood | 60/323 |
| 4,689,952 | 9/1987 | Arthur et al. | 60/313 |

FOREIGN PATENT DOCUMENTS 1286368 1/1962 France .
352912 1/1930 United Kingdom .

Primary Examiner—Douglas Hart
Attorney, Agent, or Firm—Barnes & Thornburg

[57] ABSTRACT

An exhaust manifold includes an inner shell providing a first flange having an interior and exterior surface and an outer shell cooperating with the inner shell to define an interior region therebetween. The outer shell provides a second flange having an exterior surface which is situated in spaced-apart relation to the interior surface of the first flange to form a flange-receiving space therebetween. The flange-receiving space provides an access opening into the interior region intermediate the inner and outer shells. At least one baffle is situated in the interior region. The at least one baffle includes a mounting flange nested between the first and second flanges and positioned in the flange-receiving space to extend through the access opening so that a distal portion of the mounting flange is exposed to exterior surroundings outside of the interior region defined by the inner and outer shells. Configuration of the at least one baffle is disclosed for use in single and dual exhaust manifolds.

31 Claims, 4 Drawing Sheets

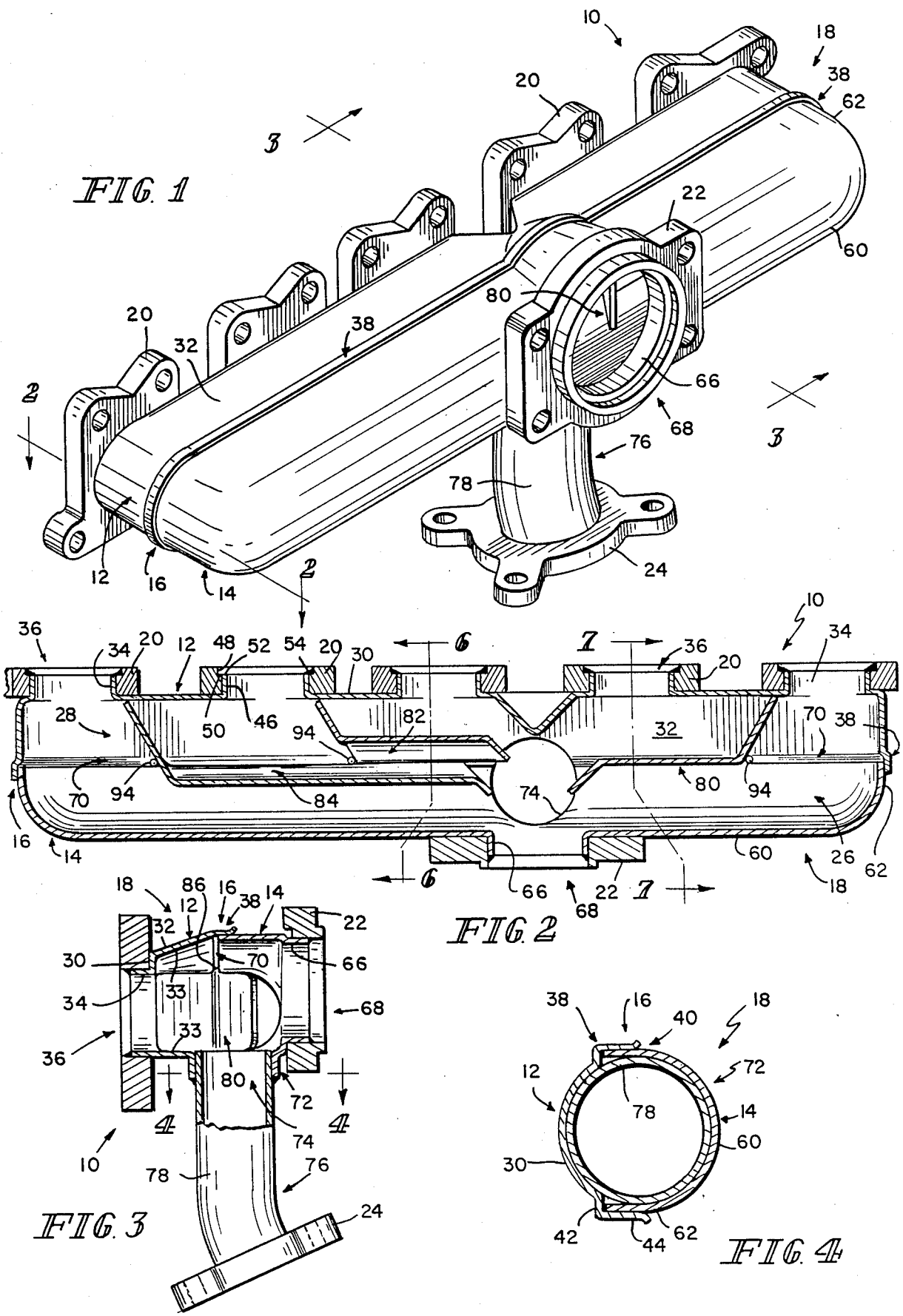

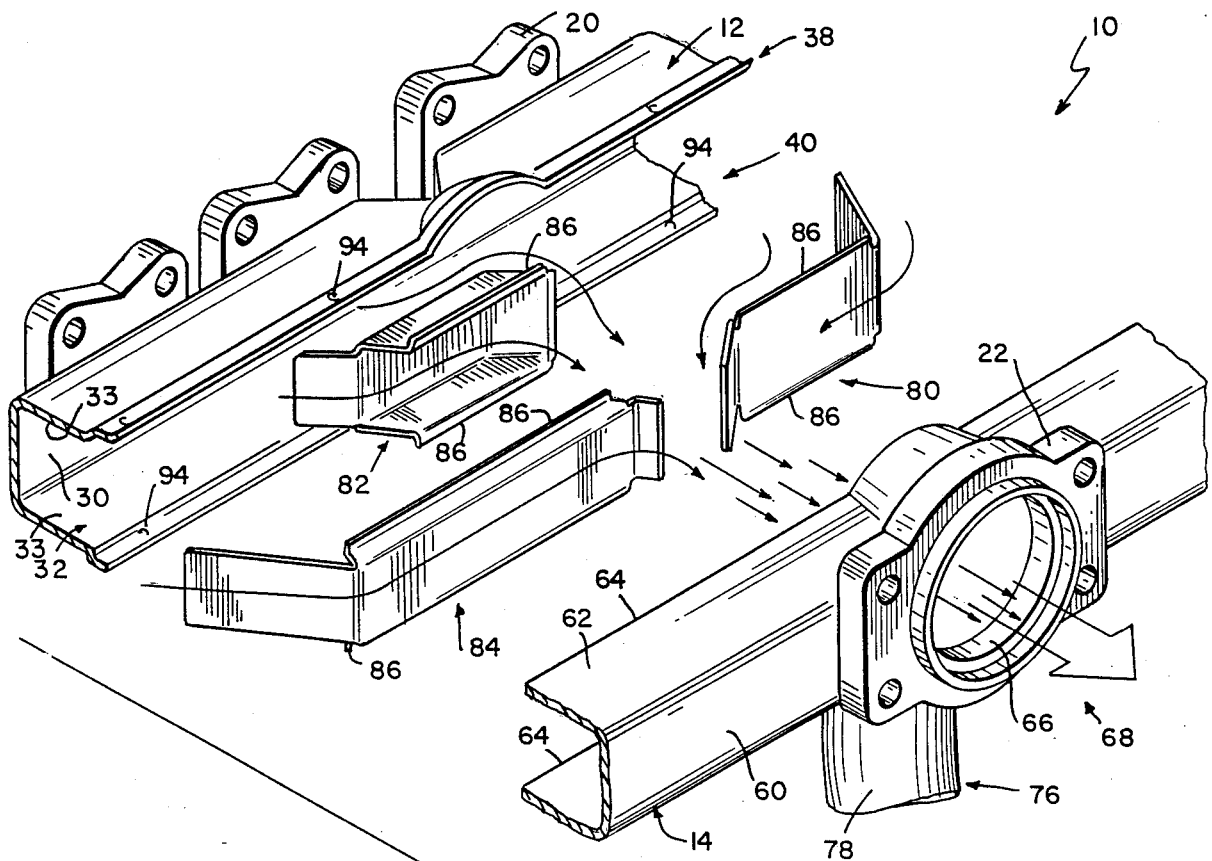
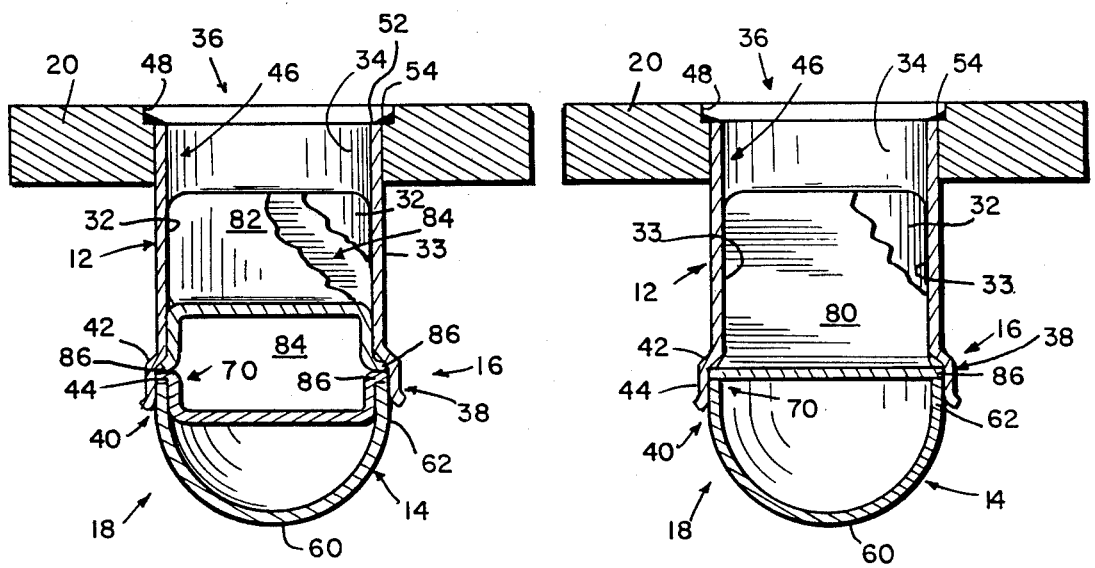

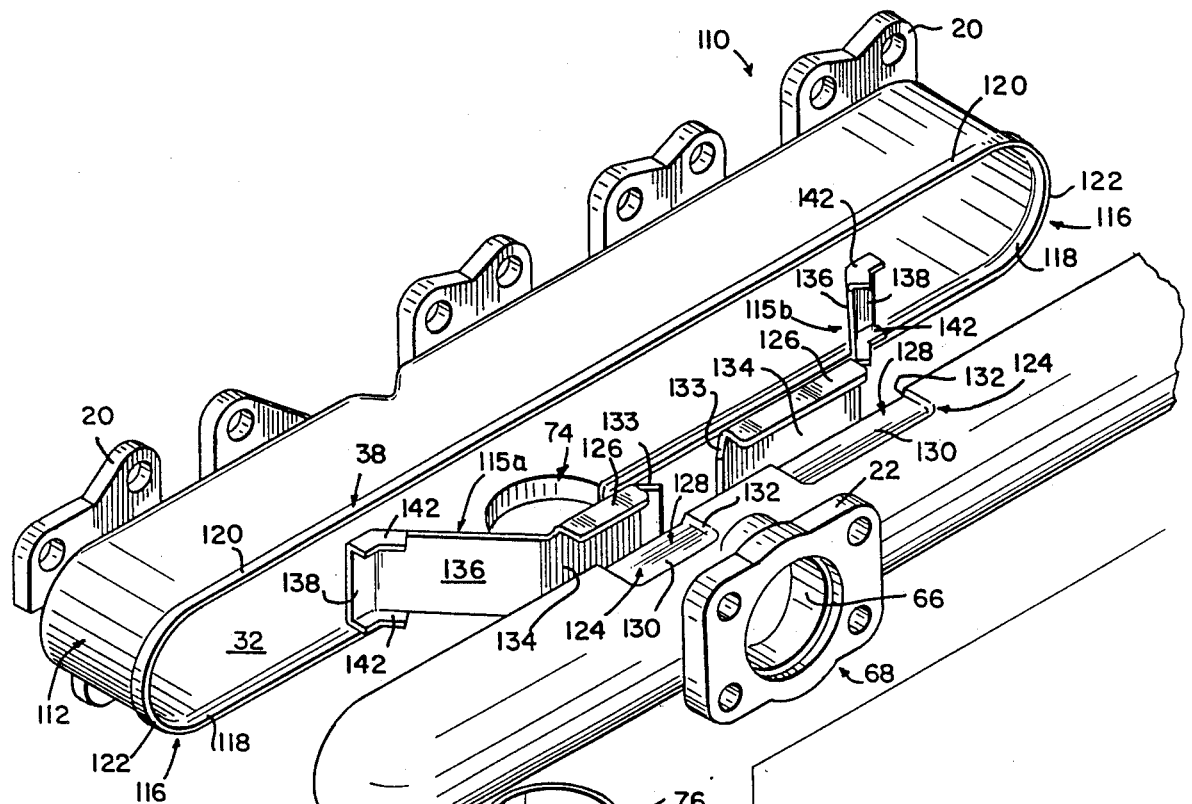
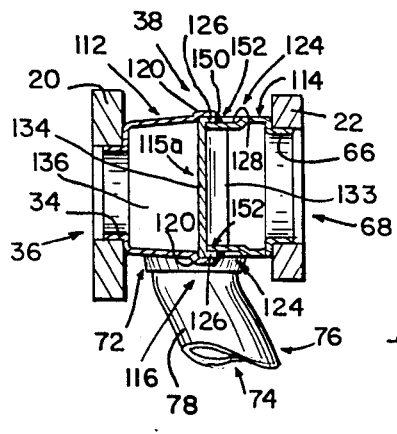
FIG. 10
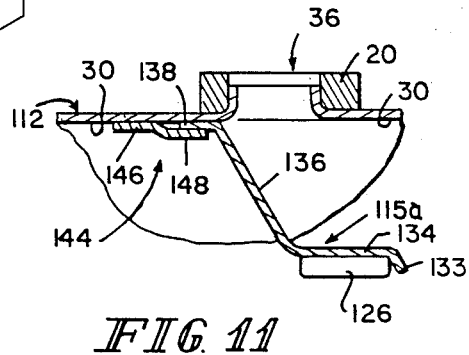
FIG. 11
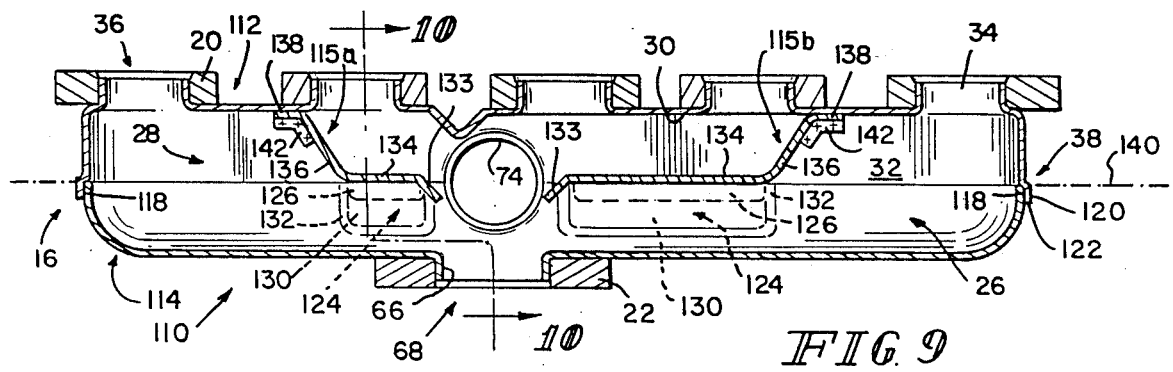
FIG. 9

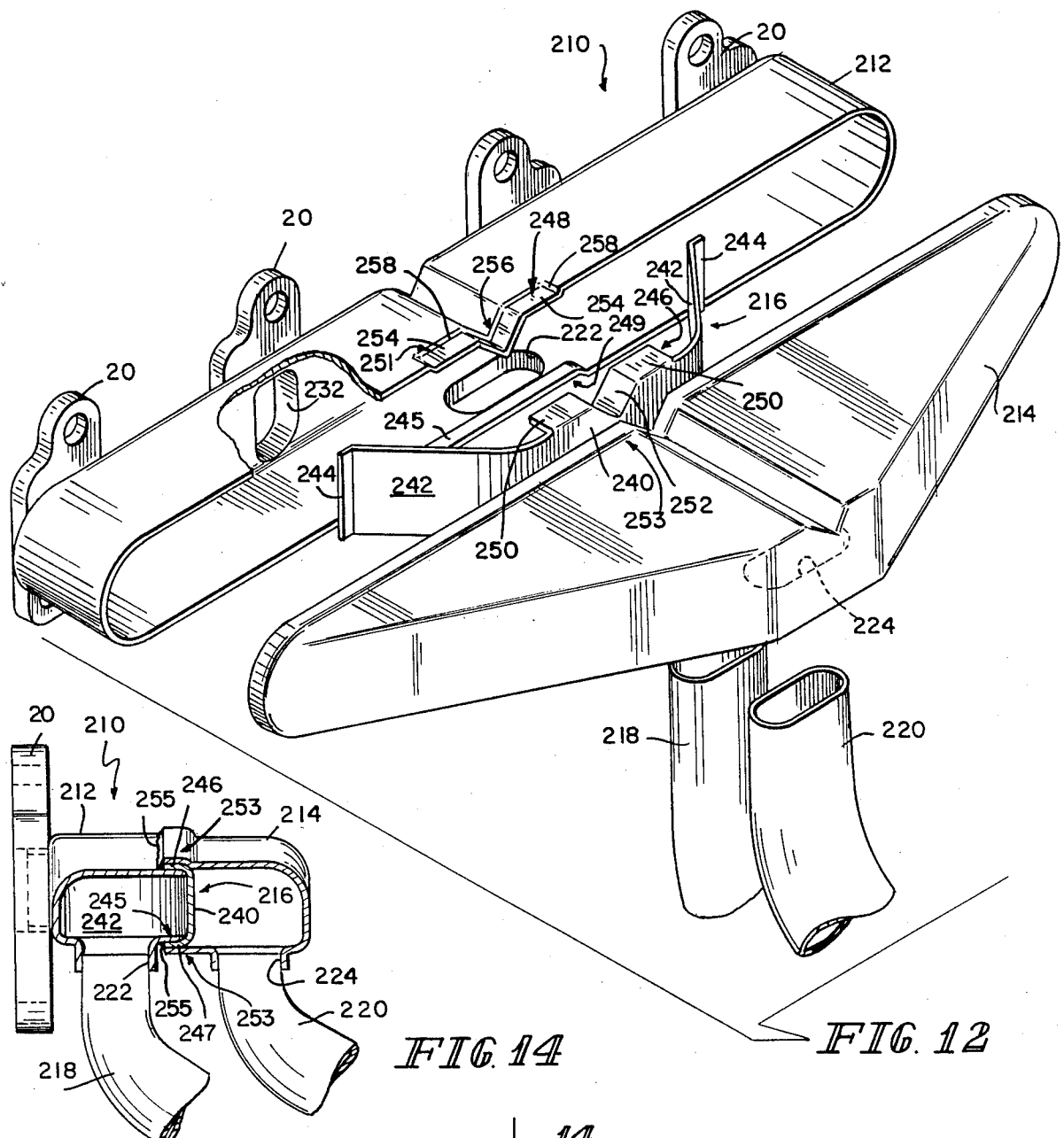
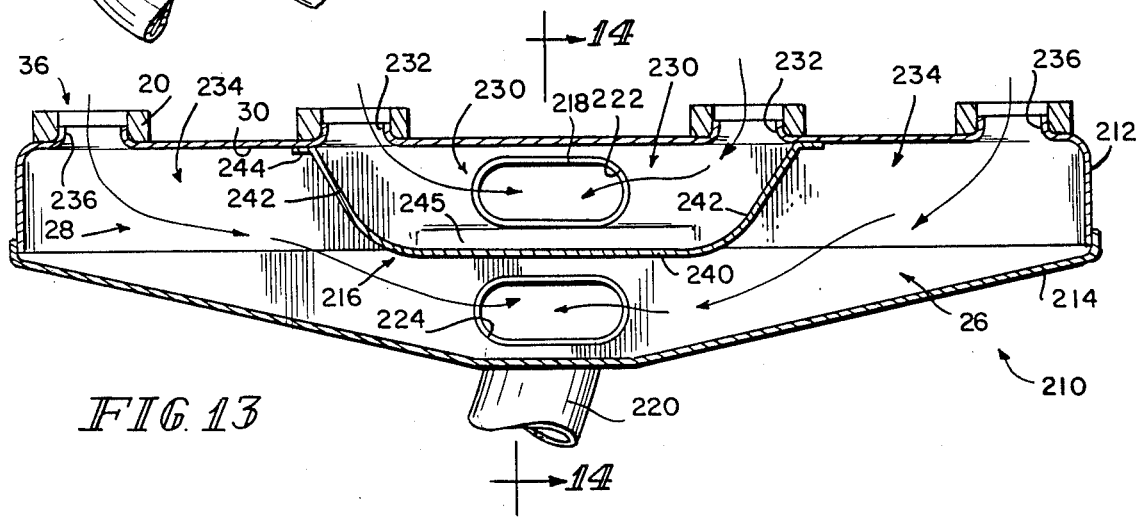

MANIFOLD BAFFLE SYSTEM

BACKGROUND AND SUMMARY OF THE INVENTION

This invention relates to an exhaust manifold for conducting exhaust gases from an engine block toward exhaust piping. In particular, this invention relates to an exhaust manifold having baffles arranged in a common space within the manifold to divide the space into a plurality of passageways thereby controlling the flow of exhaust gas through the manifold for engine performance tuning. More particularly, this invention relates to improved baffle configurations adaptable for single or dual exhaust manifolds.

Engine performance tuning is typically accomplished by means of an exhaust "header" type system. A conventional exhaust header comprises a plurality of individual elongated tubes for coupling each of the cylinder heads of an engine block to a remote manifold chamber of exhaust pipe. Adjacent exhaust ports in the engine block are "isolated" by the separate header tubes in order to tune engine performance. It is impractical to install header systems in many vehicles since these systems generally take up a significant amount of the small available space in the engine compartment. In addition, these header systems often require costly and complex welds and bends. See, for example, U.S. Pat. No. 4,373,331 to Santiago et al.

Conventional exhaust manifolds usually comprise heavy cast metal tanks coupled directly to the engine block in a position to receive engine exhaust gases. See, for example, U.S. Pat. No. 4,301,775 to Smart et al. The added weight provided by cast metal manifolds is known to affect fuel efficiency and hamper engine performance.

It is known to form an exhaust manifold using stamped sheet metal members. U.S. Pat. No. 4,537,027 to Harwood et al. discloses only an exhaust manifold of conventional configuration which has a housing formed of sheet metal construction.

U.S. Pat. No. 3,940,927 to Maurhoff et al. discloses a sheet metal shell containing a freely movable reactor chamber for afterburning engine exhaust gasses. The reactor chamber is freely movable within the shell in accordance with the thermal distortions of the reactor to minimize resulting stresses in the reactor. Maurhoff et al. does not address the problem of "tuning" an exhaust manifold.

U.S. Pat. No. 4,373,331 to Santiago et al. discloses a tubular manifold including two half-stampings welded together to form a plurality of separate exhaust tubes. A considerable amount of welding is necessary to join these two half-stampings together due to the tubular configuration of the Santiago et al. manifold. Also, the continuous webs interconnecting the exhaust tubes disclosed in Santiago et al. add additional weight to the manifold assembly. Although such a tubular design does not permit "tuning" of the various runners, it does not provide the compactness required for many crowded underhood conditions.

One object of the present invention is to provide an exhaust manifold which eliminates complex welding and bending of tubes yet is configured to permit engine performance tuning.

Another object of the present invention is to provide a compact tuned exhaust manifold which is light weight, rigid, and easy to manufacture.

Yet another object of the present invention is to provide a stamped split exhaust manifold housing with drop-in baffles to divide a common space in the housing into a plurality of separate exhaust gas passageways configured to performance-tune the exhaust manifold.

Still another object of the present invention is to provide a method of assembling a tuned exhaust manifold which is simple and requires a minimum number of welded joints.

Another object of the present invention is to provide a manifold baffle configured and positioned relative to the manifold to permit easy attachment of the baffle to the manifold using welding equipment located outside of the manifold Yet another object of the present invention is to provide improved means for anchoring a manifold baffle within its manifold housing to enhance stability and rigidity of the baffle during exposure to hot, turbulent exhaust gases in the manifold housing.

Still another object of the present invention is to provide baffle configurations adaptable for use in single and dual exhaust manifolds.

In accordance with the present invention, an exhaust manifold includes an inner shell providing a first flange having an interior and exterior surface and an outer shell cooperating with the inner shell to define an interior region therebetween. The outer shell provides a second flange having an exterior surface which is situated in spaced-apart relation to the interior surface of the first flange to form a flange-receiving space therebetween. The flange-receiving space provides an access opening into the interior region intermediate the inner and outer shells.

At least one baffle is situated in the interior region. The at least one baffle includes a mounting flange nested between the first and second flanges and positioned in the flange-receiving space to extend through the access opening so that a distal portion of the mounting flange is exposed to exterior surroundings outside of the interior region defined by the inner and outer shells. First attachment means is also provided for coupling the exposed distal portion of the mounting flange and adjacent exterior surfaces of the first and second flanges to anchor the at least one baffle in a predetermined position relative to the inner and outer shells at a first attachment site.

In one preferred embodiment of the present invention, the inner shell includes a bottom wall configured to provide inlet means for admitting combustion product into the interior region. The at least one baffle further includes flange means for engaging the bottom wall of the inner shell. The exhaust manifold further includes second attachment means for rigidly coupling the flange means to the bottom wall so that the at least one baffle is rigidly fixed to the inner shell at a second attachment remote from the first attachment site to anchor a second portion of the at least one baffle in a predetermined position relative to the inner shell, thereby fixing the at least one baffle securely in the interior region.

In other preferred embodiments of the present invention, the inner shell is formed to include inlet means for admitting combustion product discharged from an engine into the interior region. The inlet means has first and second sets of individual inlet openings, and first outlet means for exhausting combustion product from the interior region. The outer shell is formed to include second outlet means for exhausting combustion product from the interior region. In addition, the at least one baffle cooperates with the inner shell to provide first passageway means for conducting combustion product from the first set of inlet openings to the first outlet means and also cooperates with the inner and outer shells to provide second passageway means for conducting combustion product from the second set of inlet openings to the second outlet means. In this way, the at least one baffle is configured to provide a dual exhaust manifold.

Additional objects, features, and advantages of the invention will become apparent to those skilled in the art on consideration of the following detailed description of preferred embodiments exemplifying the best mode of carrying out the invention as presently perceived.

BRIEF DESCRIPTION OF THE DRAWINGS

The detailed description particularly refers to accompanying figures in which:

FIG. 1 is a perspective view of a preferred embodiment of the improved tuned exhaust manifold of the present invention;

FIG. 2 is a sectional view taken generally along lines 2—2 of FIG. 1 showing tuning baffles arranged in a common space formed in the exhaust manifold illustrated in FIG. 1 to provide a plurality of separate passageways coupling the inlet and outlet means;

FIG. 3 is a transverse sectional view taken generally along lines 3—3 of FIG. 1;

FIG. 4 is an enlarged dead section taken along lines 4—4 of FIG. 3;

FIG. 5 is an exploded isometric view of the tuned exhaust manifold of the present invention with portions broken away showing three tuning baffles of various shapes and sizes;

FIG. 6 is an enlarged sectional view taken generally along lines 6—6 of FIG. 2 with portions broken away;

FIG. 7 is an enlarged sectional view taken generally along lines 7—7 of FIG. 2 with portions broken away;

FIG. 8 is an exploded isometric view of another embodiment of the present invention showing improved baffle-mounting features;

FIG. 9 is a sectional view of the embodiment illustrated in FIG. 8 showing one embodiment of a baffle attachment means;

FIG. 10 is a sectional view taken generally along lines 10—10 of FIG. 9;

FIG. 11 is an enlarged sectional view, with portions broken away, illustrating another embodiment of a baffle attachment means suitable for use with a manifold in accordance with the present invention;

FIG. 12 is an exploded isometric view of yet another embodiment of the present invention showing one preferred baffle configuration for use in a dual exhaust manifold;

FIG. 13 is a sectional view of the embodiment illustrated in FIG. 12; and

FIG. 14 is a transverse sectional view taken generally along lines 14—14 of FIG. 13.

DETAILED DESCRIPTION OF THE DRAWINGS

The exhaust manifold 10 illustrated in FIGS. 1 and 2 includes an inner shell 12 joined to an outer shell 14 at a split line 16 to provide a housing 18. Inlet flanges 20 are provided to connect the housing 18 to an engine block or head (not shown) by means of fasteners (not shown). Outlet flanges 22, 24 are provided to connect the housing 18 to a remaining portion (not shown) of an engine exhaust system (e.g. exhaust piping, turbocharger, etc...) also by means of fasteners (not shown). The housing 18 is formed to include an interior exhaust chamber 26 as shown best in FIG. 2.

The inner shell 12 is shaped to define an interior region 28 forming approximately one-half of the exhaust chamber 26 and includes a bottom wall 30 and a continuous peripheral wall 32 having opposite side portions 33. The bottom wall 30 includes a plurality of outwardly extending inlet fixtures 34 which define inlet openings 36 for admitting exhaust gases from the engine into the exhaust chamber 26. As shown best in FIGS. 2 and 5, the peripheral wall 32 includes a perimetrical lip 38 defining an opening 40 for receiving the outer shell 14 during assembly of the exhaust manifold 10. The perimetrical lip 38 is spaced apart from the bottom wall 30 and includes a proximal beveled region 42 and a distal rim or side wall 44 which surrounds the opening 40.

In the illustrated embodiment, a separate inlet flange 20 is provided for connecting each inlet fixture 34 to the engine block or head so that the inlet openings 36 are in alignment with the engine exhaust ports of the engine block. Separate mounting flanges act to increase the strength and rigidity of the manifold structure. However, it is within the scope of the present invention to provide a unitary flange plate for joining the inlet fixtures 34 to the engine block or head.

The configuration of the separate inlet flanges 20 advantageously acts to reduce the need for complex welding and joining techniques as well as to eliminate secondary grinding or cleaning operations. Referring to FIGS. 2, 3, 6, and 7, it will be appreciated that each inlet fixture 34 fits closely within a first aperture 46 formed in a companion inlet flange 20 and extends less than the full distance through the first aperture 46. As seen best in FIG. 2, each inlet fixture 20 is also formed to include an axially outer second aperture 48 aligned in concentric relation to the axially inner first aperture 46 to provide a radially outwardly extending, weld-receiving shelf 50 on the engine side of the inlet fixture 20.

The inlet fixture 34 is inserted into the first aperture 46 of the inlet flange 20 to align the distal end 52 of the inlet fixture with the radially outwardly extending shelf 50 in substantially abutting coplanar relation. Weldment 54 is deposited onto shelf 50 and end 52 in the rim area of the second aperture 48 to join each inlet flange 20 to its companion inlet fixture 34. The welding technique necessary to deposit weldment 54 is both simple and fast.

The outer shell 14 is shaped to define an interior region forming approximately one-half of the exhaust chamber 26 and includes a top wall 60 and a continuous side wall 62 terminating at an axially inwardly facing edge 64. The top wall 60 includes a first axially outwardly extending outlet fixture 66 which defines first exhaust opening 68 for exhausting combustion product from the exhaust chamber 26. As shown best in FIGS. 2 and 3, the configuration of top outlet flange 22 is similar to that of the inlet flanges 20 to permit assembly of the top outlet flange 22 onto the first outlet fixture 66.

The continuous side wall 62 of the outer shell 14 is insertable into the opening 40 defined by the perimetrical lip 38 of the inner shell 12 during assembly of the exhaust manifold 10. Edge 64 of the outer shell is positioned in spaced-apart relation to the beveled region 48 of the inner shell 12 to define a flange-receiving space 70 best seen in FIGS. 2, 3, 6, and 7. The purpose of this space 70 is to provide means for capturing and retaining tuning baffles in predetermined performance-tuning positions within the common space provided by exhaust chamber 26.

A second outlet fixture 72 is formed to define a second exhaust opening 74 provided at the split line 16 as shown in FIGS. 2 and 3. Each of the inner and outer shells 12, 14 is configured to define a portion of the second exhaust opening 74 in the illustrated manner. An auxiliary exhaust assembly 76 includes side outlet flange 24 and is mounted in the second outlet fixture 72. The auxiliary exhaust assembly 76 conducts exhaust gas from the exhaust chamber 26 to a point of use outside of housing 18 such as exhaust piping, a turbocharger assembly, a turbo-boost waste-gate relief valve, or another component of an engine exhaust system.

A plurality of baffles 80, 82, and 84 are dropped in place and arranged in predetermined positions within the housing 18 as shown best in FIGS. 2, 6, and 7. These baffles partition the exhaust chamber 26 into a plurality of separate passageways for conducting exhaust gas through the exhaust manifold 10. Each baffle 80, 82, and 84 includes at least one mounting flange 86 for insertion into the space 70 defined between the inner and outer shells 12, 14. The mounting flanges 86 permit each baffle to be captured or trapped in its predetermined position during assembly of the exhaust manifold without welding the baffle itself.

In the illustrated embodiment, each baffle 80, 82, and 84 includes an elongated center portion 88 providing a pair of oppositely extending mounting flanges 86, an integral tongue section 90 canted at a predetermined angle in relation to the elongated center portion 88, and an integral angled outlet section 92. Inwardly-extending dimples 94 are formed in selected locations in inner shell 12 to provide stops on the housing 18 for positioning each baffle in a predetermined position.

The baffles 80, 82, and 84 are configured in the illustrated manner to aid in defining separate passageways for connecting each of the inlet openings 36 to the first and second exhaust openings 68, 74. Although the illustrated exhaust manifold 10 is configured for use with a five-cylinder engine, it will be appreciated that the unique baffle assembly of the present invention can be adapted for use with engines having various other cylinder arrangements. The minimum number of baffles required to divide the exhaust chamber into a sufficient number of separate flow-isolating passageways is two less than the number of inlet openings 36.

In the illustrated embodiment, each of the baffles 80, 82, and 84 is attached to housing 18 at the split line 16 and arranged in the illustrated pattern to define five substantially independent passageways. Each passageway connects one of the inlet openings 36 to both of the first and second exhaust openings 68, 76. It will be appreciated that each baffle could be configured in a variety of different ways to tune the exhaust manifold according to a predetermined specification and still be coupled to the housing 18 at about the split line 16 without departing from the scope of the present invention.

In the illustrated embodiment, the inner and outer shells 12, 14 are shaped to form the split line 16 and the flange-receiving space 70 in a location approximately midway between the bottom wall 30 of the inner shell 12 and the top wall 60 of the outer shell 14. Such positioning permits tuning baffles provided in the exhaust chamber to be configured in countless shapes to alter the pattern of combustion product flow through the housing 18 yet secured in position at a common split line. This feature offers greater strength and more flexibility for tuning engine performance than conventional tuned exhaust manifolds.

Three examples of suitable baffle shapes are illustrated in FIGS. 2 and 5-7. The baffles are sized to extend across the width of the common space 26 in the manifold housing 18 to divide that space 26 into separate passageways. Baffle 80 has a substantially flat center portion, while the center portion of baffle 82 is offset in a direction toward the inlet openings 36 to provide a flow channel having axially inwardly extending side walls and the center portion of baffle 84 is offset in an opposite direction away from the inlet openings 36 to provide a flow channel having axially outwardly extending side walls. Thus, the shape of the baffles can be varied to control the volume and cross-sectional area of the combustion product-conducting passageways while still securing all of the baffles to the housing 18 along the common split line 16.

The exhaust manifold 10 is assembled in the following manner. Inlet flanges 20 are fixtured and inner shell 12 is located and welded to flanges 20 to form a first subassembly. Side outlet flange 24 is fixtured and the outlet tube 78 of the auxiliary exhaust assembly 76 is located and welded to flange 24 to form a second subassembly. The baffles 80, 82, 84 are then positioned in the first subassembly using alignment dimples 94. The second subassembly 76 is then fixtured in its proper position abutting the first subassembly. The outer shell 14 is positioned over the first and second subassemblies, inserted into the perimetrical lip 38 of the inner shell 12, and clamped under load. The clamped inner shell 12, outer shell 14, and auxiliary exhaust assembly 76 are welded together to form a third subassembly. Top outlet flange 22 is fixtured and welded to the third subassembly in the illustrated orientation to complete the assembly of tuned exhaust manifold 10.

Another embodiment of the present invention is illustrated in FIGS. 8-11. This embodiment illustrates various means for easily attaching diffusion baffles to selected portions of the manifold housing to enhance the stability and rigidity of those diffusion baffles relative to the manifold housing during passage of hot, turbulent combustion product through the manifold housing. In the embodiment of FIGS. 8-11, those elements referenced by numbers identical to those in FIGS. 1-7 perform the same or a similar function.

Referring to FIGS. 8-10, exhaust manifold 110 includes inner shell 112, outer shell 114, and baffles 115a, b. Of course, it is within the scope of the present invention to construct manifold 110 to include one or more baffles 115. Outer shell 114 is illustratively formed to provide first exhaust opening 68, while inner and outer shells 112, 114 cooperate to provide second exhaust opening 74. The inner and outer shells 112, 114 also cooperate to define exhaust chamber 26 as shown in FIG. 9.

The perimetrically extending lip 38 of inner shell 112 provides a first flange 116 that, in the illustrated embodiment, extends about the periphery of inner shell 112. First flange 116 includes a substantially planar, inwardly facing interior surface 118, an outwardly facing exterior surface 120, and an exterior edge 122 as shown best in FIG. 8.

Outer shell 114 is formed to include one or more central relief portions 124. Each relief portion 124 has an exterior opening for receiving a mounting flange 126 appended to each baffle 115a, b as shown best in FIGS. 8 and 10. Outer shell 114 includes a plurality of second flanges 128, each having an outwardly facing, substantially planar surface 130 and rim 132 which cooperate to define one of the central relief portions 124. It will be appreciated that one or more central relief portions 124 can be formed at any location around the periphery of outer shell 114 to receive baffle-mounting flanges 126, depending on the desired mounting position of the baffles to be mounted within exhaust chamber 26 of manifold 110.

Each baffle 115 is illustratively of unitary construction and includes an angled leading section 133, a central section 134, an angled trailing section 136, and a distal tongue 138 appended to the trailing section 136. Illustratively, a pair of spaced-apart parallel mounting flanges 126 is appended to the central section 134 and aligned in orthogonal relation to the substantially planar central section 134. The mounting flanges 126 are desirably configured to position central section 134 in substantially coplanar relation to a reference plane 140 defined by perimetrically extending split line 16 of manifold 110 as shown best in FIG. 9. When thus mounted, central section 134 provides a longitudinally extending surface situated within the longitudinally extending housing provided by the inner and outer shells 112, 114.

As shown in FIGS. 8-10, a pair of space-apart winged tabs 142 are appended to the distal tongue 138 and a portion of the trailing section 136 to provide means for engaging the interior surface of peripheral walls 32 of the inner shell 112. For example, winged tabs 142 can be spot-welded to walls 32 and/or each tongue 138 can be tack-welded to the bottom wall 30 of inner shell 112. It will be appreciated by those skilled in the art that various welding means and techniques can be employed to join either or both of the tongues 138 and winged tabs 142 to the inner shell 112 to anchor that portion of the baffle 115 to the manifold housing.

Alternatively, as shown in FIG. 11, mechanical means can be employed in lieu of weld means to anchor a portion of each baffle 115 in close proximity to the inlet opening 36 to the manifold housing. For example, a stamped bracket 144 having a connecting tab 146 TIG-welded to bottom wall 30 and a stepped locking tab 148 configured to trap tongue 138 of baffle 115 against bottom wall 30 can provide a suitable alternative to the attachment means illustrated in FIGS. 8-10.

Once each baffle tongue 138 is fixed to the inner shell 112, assembly of manifold 110 is completed by moving outer shell 114 into engagement with inner shell 112 so that the central relief portions 124 formed in outer shell 114 receive a complementary shaped baffle mounting flange 126 as shown best in FIGS. 9 and 10. Each mounting flange 126 so received is, in effect, nested or sandwiched between the inwardly facing interior surface 118 of the first flange 116 provided by the inner shell 112 and the outwardly facing surface 130 of the second flange 128 provided by the outer shell 114.

One advantage of this arrangement is that attachment means, e.g., weld 150 illustrated in FIG. 10, is easily applied using conventional techniques on the exterior of manifold 110 to couple flanges 116, 126, and 128 to one another. Such exterior welding is made possible since the distal portion of each mounting flange 126 extends outwardly from inner region 26 through access opening 152 provided between the first and second flanges 116, 128, as shown best in FIG. 10. Thus, each mounting flange 126 is exposed to the exterior surroundings outside of manifold 110 to communicate easily with welding materials and equipment located outside of manifold 110.

Yet another embodiment of the invention is illustrated in FIGS. 12-14. This embodiment illustrates preferred baffle and shell configurations for providing a manifold having a dual exhaust feature. In the embodiment of FIGS. 12-14, those elements referenced by numbers identical to those in FIGS. 1-11 perform the same or similar function.

Exhaust manifold 210 includes inner shell 212, outer shell 214, baffle 216, and first and second exhaust pipes 218, 220. First exhaust pipe 218 is coupled to inner shell 212 at first outlet 222 and second exhaust pipe 220 is coupled to outer shell 214 at second outlet 224. Illustratively, a single baffle 216 is mounted in manifold 210 to partition exhaust chamber 26 into a first passageway 230 coupling a first set of inlet openings 232 to first outlet 222 and a second passageway 234 coupling a second set of inlet openings 236 to second outlet 224.

Baffle 216 includes an elongated central portion 240 and a pair of angled side portions 242 appended to opposite distal ends of central portion 240. A distal tongue 244 is appended to the distal end of each side portion 242 and configured to engage the bottom wall 30 of interior shell 212 as shown in FIG. 13. It will be appreciated that tongue 244 is connected to wall 30 using any of the various attachment means noted in connection with the embodiment of FIGS. 8-11 or their equivalents.

Baffle 216 further includes a pair of side mounting flanges 246, 247 which are appended to opposite side portions of central portion 240 as shown best in FIG. 14. Mounting flanges 246, 247 mateably engage, respectively, central relief portions 248, 249 (shown best in FIG. 12), formed in opposite peripheral edges of inner shell 212. Mounting flange 246 includes a pair of longitudinally spaced-apart substantially planar portions 250 and a V-shaped portion 252 interconnecting the two planar portions 250 as shown best in FIG. 12. Mounting flange 247 is substantially flat, appended to central portion 240, and aligned in orthogonal relation to the central portion 240. Mounting flanges 246 and 247 are sandwiched between an outwardly facing flange 251 provided by inner shell 212 and an inwardly facing flange 253 provided by outer shell 214 and coupled in such nested means using attachment means, e.g., weld 255, of the types disclosed in connection with the embodiment of FIGS. 8-11.

Central relief portion 248 of inner shell 212 is formed to have a complementary shape to the mounting flange 246 to facilitate mating engagement therebetween. In particular, relief portion 248 provides the outwardly facing flange and is defined by longitudinally space-apart planar surfaces 254, V-shaped surface 256, and peripheral rim 258 as shown in FIG. 12. Advantageously, the interlocking V-shaped elements 252 and 256 cooperate to limit relative movement of the baffle 216 and the inner and outer shells 212, 214 to enhance the rigidity and stability of the exhaust manifold 210.

Central relief portion 249 is formed to have a complementary shape to the mounting flange 247 to facilitate mating engagement therebetween. In particular, flange 247 is flat to lie within the elongated pocket defined by flanges 245 and 253 as shown best in FIG. 14.

At the same time, baffle 216 acts to divert a portion of the combustion product admitted into manifold 210 to the first exhaust pipe 218 and a remaining portion of said combustion product to the second exhaust pipe 220. Such a configuration advantageously employs an easily assembled and welded baffle in accordance with the present invention to provide a dual exhaust manifold.

Although the invention has been described in detail with reference to certain preferred embodiments, variations and modifications exist within the scope and spirit of the invention as described and defined in the following claims.

What is claimed is:

1. An exhaust manifold comprising
an inner shell providing a first flange having an interior and exterior surface,
an outer shell cooperating with the inner shell to define an interior region therebetween and providing a plurality of spaced-apart second flanges, each second flange having an exterior surface, the exterior surface of each second flange being situated in spaced-apart relation to the interior surface of the first flange to form flange-receiving spaces therebetween and an access opening into the interior region corresponding to each flange-receiving space,
at least one baffle situated in the interior region, each baffle including a mounting flange nested between the first flange and one of the second flanges and positioned in the flange-receiving space formed therebetween to extend outwardly through a corresponding access opening so that a distal portion of the mounting flange is exposed to exterior surroundings outside of the interior region defined by the inner and outer shells, and
means situated outside the interior region for coupling the exposed distal portion of each mounting flange and adjacent exterior surfaces at least one of the first and second flanges to anchor each baffle in a predetermined position relative to the inner and outer shells.

2. The exhaust manifold of claim 1, wherein the interior surface of the first flange and the exterior surface of the second flange are aligned in substantially spaced-apart opposing relation.

3. An exhaust manifold comprising
an inner shell providing a first flange having an interior and exterior surface,
an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells,
at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and
first attachment means for coupling the exposed distal portion of the mounting flange and adjacent exterior surfaces of the first and second flanges to anchor the at least one baffle in a predetermined position relative to the inner and outer shells at a first attachment site, the interior surface of the first flange and the exterior surface of the second flange being aligned in substantially spaced-apart opposing relation, the interior surface of the first flange and the exterior surface of the second flange each including substantially planar portions aligned in substantially parallel relation.

4. An exhaust manifold comprising
an inner shell providing a first flange having an interior and exterior surface,
an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells,
at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and
first attachment means for coupling the exposed distal portion of the mounting flange and adjacent exterior surfaces of the first and second flanges to anchor the at least one baffle in a predetermined position relative to the inner and outer shells at a first attachment site, the interior surface of the first flange and the exterior surface of the second flange being aligned in substantially spaced-apart opposing relation, a portion of the interior surface of the first flange including two spaced-apart substantially planar portions and a V-shaped portion interconnecting the two planar portions and a portion of the exterior surface of the second flange being configured to have a predetermined shape complementary to the shape defined by said portion of the interior surface of the first flange.

5. An exhaust manifold comprising
an inner shell providing a first flange having an interior and exterior surface,
an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells,
at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and first attachment means for coupling the exposed distal portion of the mounting flange and adjacent exterior surfaces of the first and second flanges to anchor the at least one baffle in a predetermined position relative to the inner and outer shells at a first attachment site, the inner shell including a bottom wall configured to provide inlet means for admitting combustion product into the interior region, the at least one baffle further including flange means for engaging the bottom wall of the inner shell, and further comprising second attachment means for rigidly coupling the flange means to the bottom wall so that the at least one baffle is rigidly fixed to the inner shell at a second attachment remote from the first attachment site to anchor a second portion of the at least one baffle in a predetermined position relative to the inner shell, thereby fixing the at least one baffle securely in the interior region.

6. An exhaust manifold comprising an inner shell providing a first flange having an interior and exterior surface, an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells, at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and first attachment means for coupling the exposed distal portion of the mounting flange and adjacent exterior surfaces of the first and second flanges to anchor the at least one baffle in a predetermined position relative to the inner and outer shells at a first attachment site, the inner shell including a bottom wall configured to provide inlet means for admitting combustion product into the interior region, the at least one baffle further including flange means for engaging the bottom wall of the inner shell, and further comprising second attachment means for rigidly coupling the flange means to the bottom wall so that the at least one baffle is rigidly fixed to the inner shell at a second attachment remote from the first attachment site to anchor a second portion of the at least one baffle in a predetermined position relative to the inner shell, thereby fixing the at least one baffle securely in the interior region, the flange means including a distal tongue and the second attachment means including at least one winged tab appended to the distal tongue and connection means for coupling at least one of the distal tongue and the at least one winged tab to the inner shell.

7. An exhaust manifold comprising an inner shell providing a first flange having an interior and exterior surface, an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells, at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and first attachment means for coupling the exposed distal portion of the mounting flange and adjacent exterior surfaces of the first and second flanges to anchor the at least one baffle in a predetermined position relative to the inner and outer shells at a first attachment site, the inner shell including a bottom wall configured to provide inlet means for admitting combustion product into the interior region, the at least one baffle further including flange means for engaging the bottom wall of the inner shell, and further comprising second attachment means for rigidly coupling the flange means to the bottom wall so that the at least one baffle is rigidly fixed to the inner shell at a second attachment remote from the first attachment site to anchor a second portion of the at least one baffle in a predetermined position relative to the inner shell, thereby fixing the at least one baffle securely in the interior region, the second attachment means including a bracket having a connecting tab coupled to the bottom wall and a locking tab configured to hold the flange means against the bottom wall, thereby securely trapping the flange means between the locking tab and the bottom wall.

8. An exhaust manifold comprising an inner shell providing a first flange having an interior and exterior surface, an outer shell cooperating with the inner shell to define an interior region therebetween and providing a second flange having an exterior surface, the exterior surface of the second flange being situated in spaced-apart relation to the interior surface of the first flange to form a flange-receiving space therebetween providing an access opening into the interior region intermediate the inner and outer shells, at least one baffle situated in the interior region, the at least one baffle including a mounting flange nested between the first and second flanges and positioned in the flange-receiving space to extend through the access opening so that a distal portion of the mounting flange is exposed to exterior surroundings outside of the interior region defined by the inner and outer shells, and first attachment means for coupling the exposed distal portion of the mounting flange and adjacent exterior surfaces of the first and second flanges to anchor the at least one baffle in a predetermined position relative to the inner and outer shells at a first attachment site, the inner shell being formed to include inlet means for admitting combustion product discharged from an engine into the interior region, the inlet means having first and second sets of individual inlet openings, and first outlet means for exhausting combustion product from the interior region, the outer shell being formed to include second outlet means for exhausting combustion product from the interior region, and the at least one baffle cooperating with the inner shell to provide first passageway means for conducting combustion product from the first set of inlet openings to the first outlet means and also cooperates with the inner and outer shells to provide second passageway means for conducting combustion product from the second set of inlet openings to the second outlet means.

9. The exhaust manifold of claim 8, wherein the inner shell includes a bottom wall configured to provide inlet means for admitting combustion product into the interior region, the at least one baffle further includes flange means for engaging the bottom wall of the inner shell, and further comprising second attachment means for rigidly coupling the flange means to the bottom wall so that the at least one baffle is rigidly fixed to the inner shell at a second attachment site remote from the first attachment site in a predetermined position relative to the inner shell, thereby fixing the at least one baffle to anchor the at least one baffle securely in the interior region at more than one location.

10. An exhaust manifold for attachment to an engine having a plurality of exhaust ports, the exhaust manifold comprising a housing formed to include an exhaust chamber, inlet means for admitting combustion product discharged from the engine exhaust ports into the exhaust chamber, and outlet means for exhausting combustion product from the exhaust chamber, the housing further including an inner shell having a first flange and providing the inlet means and an outer shell having at least one second flange positioned in spaced-apart confronting relation to the first flange of the inner shell to define a flange-receiving space corresponding to each second flange, weld means for attaching the inner shell to the outer shell at a perimetrically extending split line of the housing, the inner and outer shells cooperating to define the exhaust chamber therebetween and to form the flange-receiving space at about the split line so that the flange-receiving space provides an access opening into the exhaust chamber intermediate the inner and outer shells, and baffle means for partitioning the exhaust chamber to define separate passageways connecting each of the engine exhaust ports to the outlet means so that the flow of combustion product discharged from each engine exhaust port and admitted into the exhaust chamber is substantially isolated in its companion passageway as it is conducted through the housing to permit performance tuning of the exhaust manifold, the baffle means including at least one baffle, each baffle including at least one mounting flange positioned in one of the flange-receiving spaces to nest between the first flange and a second flange corresponding to said one of the flange-receiving spaces, and first attachment means in the access opening for coupling the at least one mounting flange to the housing at the split line.

11. The exhaust manifold of claim 10, wherein the first and second flanges are aligned in substantially parallel relation.

12. The exhaust manifold of claim 10, wherein each of the first and second flanges include substantially planar surfaces and the planar surfaces provided by the first and second flanges are aligned in substantially parallel relation.

13. The exhaust manifold of claim 10, wherein each of the first and second flanges include complementary substantially V-shaped surfaces that are substantially mateable to limit longitudinal movement of the outer shell relative to the inner shell.

14. The exhaust manifold of claim 10, wherein the inner and outer shells are elongated to provide a longitudinally extending housing, at least one of the baffles includes a substantially planar longitudinally extending surface aligned in substantially coplanar relation with a longitudinally extending reference plane defined by the perimetrically extending split line of the longitudinally extending housing, and the first and second flanges are aligned in substantially orthogonal relation to the longitudinally extending surface of said at least one baffle.

15. The exhaust manifold of claim 10, wherein the first attachment means communicates with the first flange, at least one of the second flanges, and the mounting flange positioned in the flange-receiving space defined by the first flange and said at least one of the second flanges.

16. The exhaust manifold of claim 10, wherein the inner shell includes a bottom wall configured to provide the inlet means, and wherein at least one of the baffles further includes flange means for engaging the bottom wall of the inner shell, and further comprising second attachment means for rigidly connecting the flange means to the bottom wall so that said at least one of the baffles is rigidly fixed to the inner shell at a location remote from the split line of the housing to anchor said at least one of the baffles securely within the exhaust chamber at more than one location on the housing.

17. The exhaust manifold of claim 16, wherein the flange means includes a distal tongue and the second attachment means includes at least one winged tab appended to the distal tongue and connection means for coupling at least one of the distal tongue and the at least one winged tab to the inner shell.

18. The exhaust manifold of claim 16, wherein the second attachment means includes a bracket having a connecting tab coupled to the bottom wall and a locking tab configured to hold the flange means against the bottom wall, thereby securely trapping the flange means between the locking tab and the bottom wall.

19. An exhaust manifold for attachment to an engine having a plurality of exhaust ports, the exhaust manifold comprising an inner shell formed to include a plurality of inlet openings for receiving combustion product discharged from the engine exhaust ports and an inwardly presented flange-engaging surface, an outer shell including at least one outwardly presented flange-engaging surface situated in substantially spaced-art confronting relation to the inwardly presented flange-engaging surface of the inner shell to define a flange-receiving space therebetween, means for coupling the outer shell to the inner shell to define a split line extending about the perimeter of the exhaust manifold, the inner and outer shells cooperating to form an exhaust chamber therebetween, outlet means for exhausting combustion product from the exhaust chamber, and baffle means for dividing the exhaust chamber into at least two separate passageways to that the flow of combustion product admitted into the exhaust manifold is directed in a predetermined pattern toward the outlet means to permit performance tuning of the exhaust manifold, the baffle means including at least one baffle, each baffle having at least one elongated mounting flange sandwiched between the inwardly presented, flange-engaging surface of the inner shell and an outwardly presented flange-engaging surface of the outer shell in said flange-receiving space to position said each baffle relative to the inner and outer shells in a predetermined location within the exhaust chamber.

20. The exhaust manifold of claim 19, wherein the inwardly and outwardly presented flange-engaging surfaces are aligned in substantially parallel relation.

21. The exhaust manifold of claim 19, wherein the coupling means communicates with the inwardly presented flange-engaging surface, at least one of the outwardly presented flange-engaging surfaces, and the mounting flange sandwiched in the flange-receiving space defined by the inwardly presented flange and said at least one of the outwardly presented flange-engaging surfaces.

22. The exhaust manifold of claim 19, wherein the inner shell includes a bottom wall configured to provide the inlet means, and at least one of the baffles further includes flange means for engaging the bottom wall of the inner shell, and further comprising attachment means for rigidly connecting the flange means to the bottom wall so that said at least one of the baffles is rigidly fixed to the inner shell at a location remote from the split line of the housing to anchor said at least one of the baffles securely within the housing.

23. An exhaust manifold for attachment to an engine having a plurality of exhaust ports, the exhaust manifold comprising a housing formed to include an exhaust chamber, inlet means for admitting combustion product discharged from the engine exhaust ports into the exhaust chamber, and outlet means for exhausting combustion product from the exhaust chamber, the housing including an inner shell having a bottom wall configured to provide the inlet means and an outer shell attached to the inner shell at a perimetrically extending split line of the housing, the inner and outer shell cooperating to define the exhaust chamber therebetween, and baffle means for partitioning the exhaust chamber to define at least two separate passageways connecting each of the engine exhaust ports to the outlet means so that the flow of combustion product discharged from each engine exhaust port and admitted into the exhaust chamber is substantially isolated in its companion passageway as it is conducted through the housing to permit performance tuning of the exhaust manifold, the baffle means including at least one baffle, first attachment means for rigidly coupling one portion of each baffle to the inner and outer shells at about the split line, and second attachment means for rigidly coupling another portion of each baffle to the inner shell at a location remote from the split line of the housing in close proximity to the inlet means to aid in preventing movement of each baffle relative to the inner and outer shells during travel of combustion product through said at least two separate passageways toward the outlet means, thereby enhancing the stability of the baffle means.

24. The exhaust manifold of claim 23, wherein each baffle includes a distal tongue engaging the bottom wall of the inner shell and the second attachment means includes at least one winged tab appended to the distal tongue and means for coupling at least one of the distal tongue and the at least one winged tab to the inner shell.

25. The exhaust manifold of claim 23, wherein each baffle includes a distal tongue engaging the bottom wall of the inner shell and the second attachment means includes a bracket having a connecting tab coupled to the bottom wall and a locking tab configured to hold the distal tongue against the bottom wall, thereby securely trapping the distal tongue between the locking tab and the bottom wall.

26. An exhaust manifold for attachment to an engine having a plurality of exhaust ports, the exhaust manifold comprising a housing formed to include an exhaust chamber, inlet means for admitting combustion product discharged from the engine exhaust ports into the exhaust chamber, and first and second outlet means for exhausting combustion product from the exhaust chamber, and baffle means rigidly fixed in the exhaust chamber for partitioning the exhaust chamber to define first passageway means for connecting a first set of the engine exhaust ports only to the first outlet means and second passageway means for connecting a second set of the engine exhaust ports only to the second outlet means so that the flow of combustion product discharged from each set of engine exhaust ports and admitted into the exhaust chamber is substantially isolated in a predetermined passageway as it is conducted through the housing toward one of the first and second outlet means to permit performance tuning of the exhaust manifold.

27. The exhaust manifold of claim 26, wherein the housing includes an inner shell providing the inlet means and the first outlet means, and an outer shell providing the second outlet means and being attached to the inner shell at a perimetrically extending split line, the inner and outer shell cooperating to define the exhaust chamber therebetween, and the baffle means is rigidly attached to the housing at about the split line.

28. The exhaust manifold of claim 27, wherein the inner and outer shells cooperate to define a flange-receiving space therebetween at the split line, and the baffle means includes at least one mounting flange trapped in the flange-receiving space so that the baffle means is retained in a predetermined position within the exhaust chamber.

29. The exhaust manifold of claim 28, wherein the inner shell includes a bottom wall configured to provide the inlet means, and wherein the baffle means further includes flange means for engaging the bottom wall of the inner shell, and further comprising attachment means for rigidly connecting the flange means to the bottom wall so that said baffle means is rigidly fixed to the inner shell at a location remote from the split line of the housing to anchor said baffle means securely within the exhaust chamber at more than one location on the housing

30. The exhaust manifold of claim 28, wherein the inner shell includes a bottom wall configured to provide the inlet means, the baffle means includes an elongated central portion providing the at least one mounting flange, first flange means appended to one end of the central portion for engaging a first portion of the bottom wall of the inner shell, and second flange means appended to the other end of the central portion for engaging a second portion of the bottom wall of the inner shell.

31. An exhaust manifold comprising an inner shell providing a first flange extending about the perimeter of the inner shell, the first flange having a radially inwardly facing interior surface and a radially outwardly facing exterior surface an outer shell providing a rim extending about the perimeter of the inner shell, the rim being configured to fit inside the first flange of the inner shell so that the rim engages the radially inwardly facing interior surface of the first flange and the outer shell cooperates with the inner shell to define an interior region therebetween, the rim of the outer shell providing a second flange having a radially outwardly facing exterior surface situated in spaced-apart, confronting relation to the radially inwardly facing interior surface of the first flange to form a flange-receiving space therebetween, the flange-receiving space providing an access opening into the interior region intermediate the inner and outer shells.

at least one baffle situated in the interior region, the at least one baffle including a mounting flange nested between the first and second flanges and positioned in the flange-receiving space therebetween to extend through the access opening so that a distal portion of the mounting flange is exposed to exterior surroundings outside of the interior region defined by the inner and outer shells, and means for coupling the exposed distal portion of the mounting flange and adjacent exterior surfaces of the first and second flanges to anchor the at least one baffle in a predetermined position relative to the inner and outer shells.

* * * * *